United States Patent

[11] 3,550,517

| [72] | Inventor | Arthur C. Mueller<br>Niles, Ill. |
|---|---|---|
| [21] | Appl. No. | 735,328 |
| [22] | Filed | June 7, 1968 |
| [45] | Patented | Dec. 29, 1970 |
| [73] | Assignee | Bell & Howell Company<br>Chicago, Ill.<br>a corporation of Illinois |

[54] TRIANGULATION RANGEFINDING MECHANISM WITH LOCKING DEVICE
4 Claims, 6 Drawing Figs.

[52] U.S. Cl. .................................................. 95/44;
352/139
[51] Int. Cl. .................................................. G03b 19/18
[50] Field of Search .................................................. 95/44, 45;
353/101; 355/58; 352/140, 139; 350/41, 46

[56] References Cited
UNITED STATES PATENTS

| 1,258,459 | 3/1918 | Read ............................... | 95/44 |
| 2,456,317 | 12/1948 | Rabinow ......................... | 352/140(X) |
| 2,955,518 | 10/1960 | Perry ............................... | 350/187(X) |

*Primary Examiner*—John M. Horan
*Assistant Examiner*—Richard L. Moses
*Attorneys*—William F. Pinsak and John E. Peele, Jr.

ABSTRACT: An improved rangefinding mechanism for a camera having a focusable objective, the mechanism including a pendulous member mounted for orientation by gravity to enable adjustment of the objective into focus on a remote subject using the principle of triangulation to determine the camera-to-subject distance. The improvement relates to a brake device actuated by a linkage controlled by the objective to release the pendulous member upon adjustment of the objective to a determined position at or beyond one end of its focusing range, and to lock the pendulous member when the objective is adjusted from the determined position.

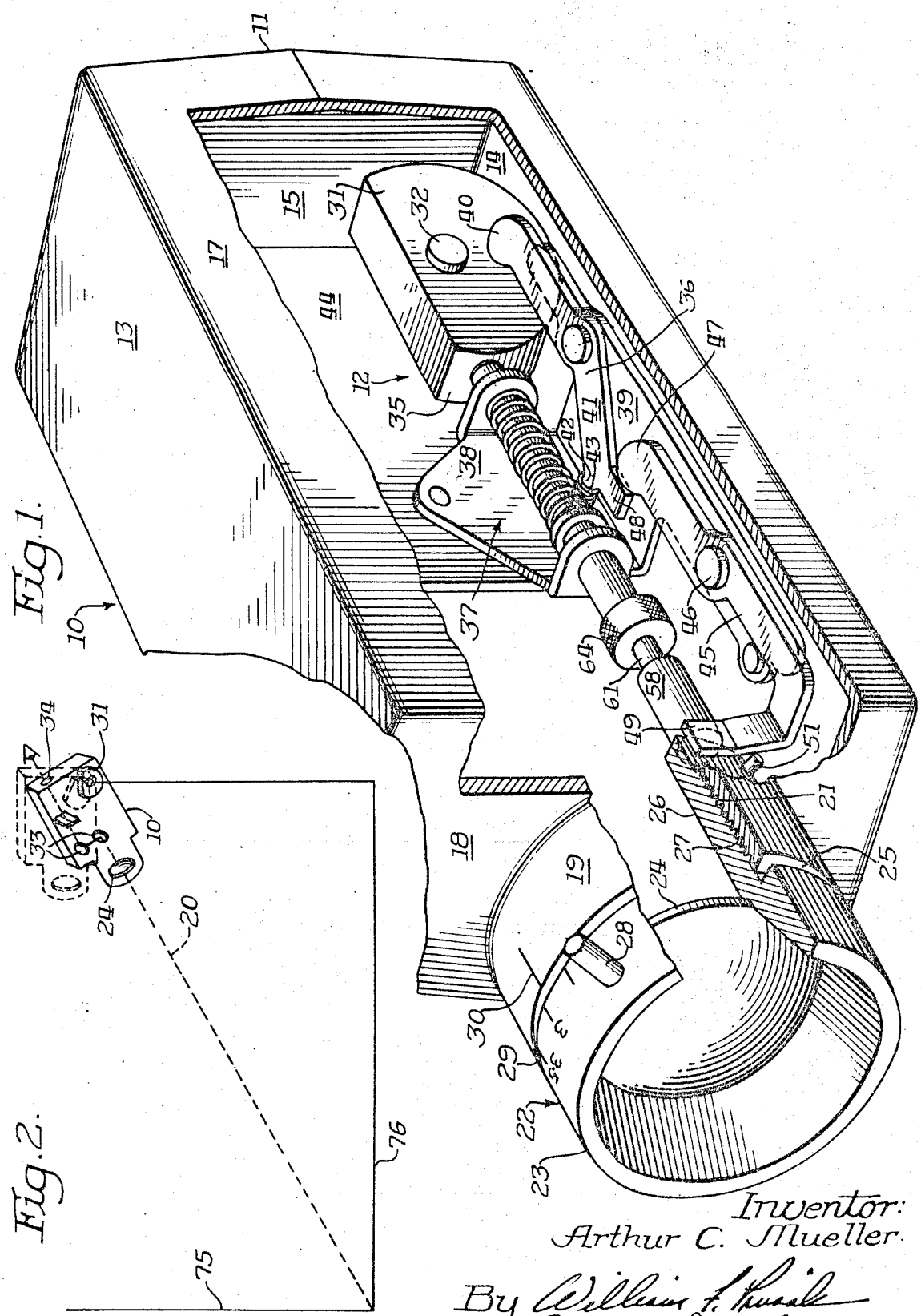

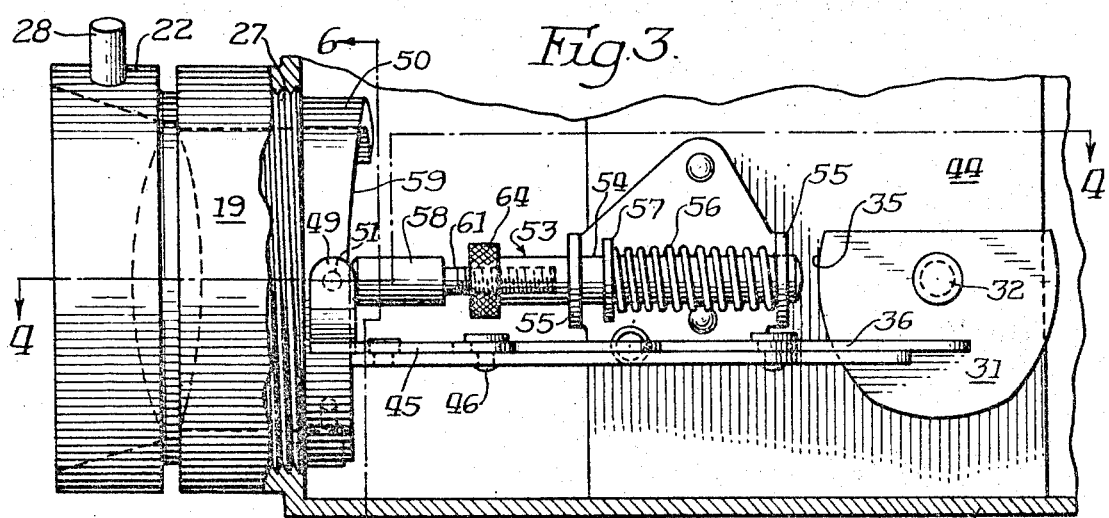
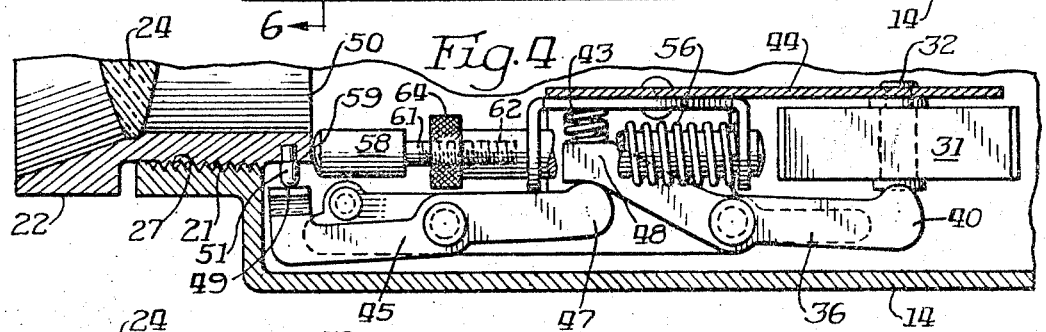
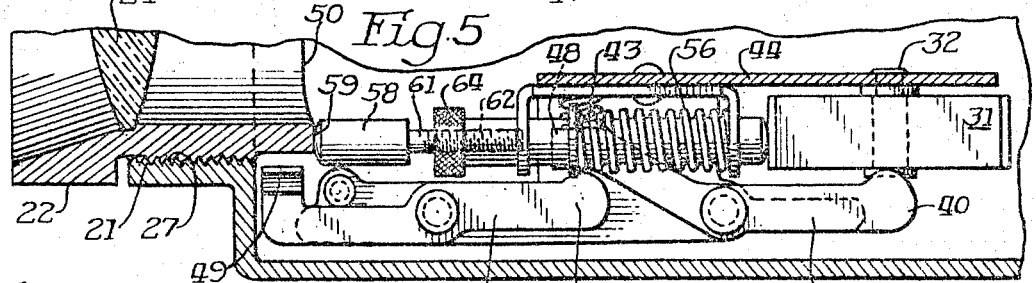
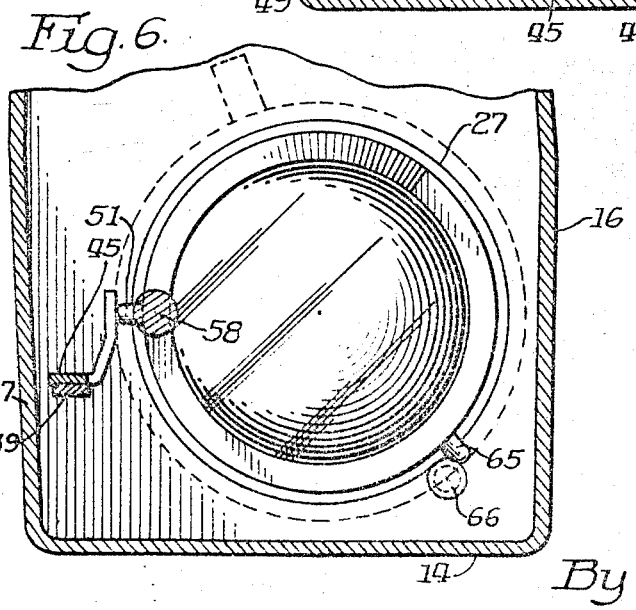

TRIANGULATION RANGEFINDING MECHANISM WITH LOCKING DEVICE

The present invention relates to a camera focusing mechanism, the objective lens of which is adjustable to focal distances determined by a rangefinder based upon the principle of triangulation and using a movable pendulous member. Particularly, the invention relates to a brake device to releasably lock the pendulous member in an assumed position.

Pendulous rangefinders for determining the focal distance between a camera subject have been known. This type of rangefinder employs the principle of triangulation to effectively measure the unknown distance from camera to subject by the utilization of a known distance (height of camera above a base line) with a system through which an angular relationship may readily be established. The angle is determined by the movement of a gravity influenced pendulous member having a cam surface. The principle of triangulation and a device for translating the position of the pendulous member to an "in focus" condition of an adjustable focusable objective lens are described more fully in a copending application, filed on even date herewith assigned to the assignee of the present application and titled Camera Focusing Mechanism Using Triangulation Principle.

A mechanism for setting an objective lens "in focus" according to the angular condition of a pendulous member of a rangefinder is disclosed in U.S. Pat. No. 1,258,459. That focusing mechanism also discloses a rudimentary brake device to hold a pendulous member while an objective lens is adjustable relative to a position assumed by that pendulous member. That mechanism, however, is not adapted for present day cameras in which externally located movable components are not desirable. Further, the several manipulations required of the user to focus the camera's objective lens are not desirable. Also, that mechanism is not adapted for use in the very limited space available for such a mechanism in today's cameras, which are usually as compact as the functioning mechanisms permit.

Thus, an object of the present invention is to provide an improved focusing mechanism for a camera, which mechanism includes a brake device to retain a focus determining element in position until the camera's objective lens has been focused.

Another object is to provide a novel brake device to releasably lock a pendulous member in an "in focus" condition while an objective lens is adjusted from an initial position toward an "in focus" condition.

The features in a camera for effecting the foregoing objects comprise an objective lens assembly including a lens arranged for adjustment for focusing a subject in a focal plane. A pendulous member is mounted for gravity oriented movement relative to the camera to any of a plurality of positions corresponding to the angular disposition of the optical axis of the lens with respect to the base of the subject. While the pendulous member is so oriented, the objective lens is adjusted to a condition of focus. To retain the pendulous member in this assumed position, a brake device is actuated under control of the objective lens assembly by a linkage. Upon actuation of the assembly from an initial position, the brake device locks the pendulous member against further movement while the objective lens is adjusted to a condition of focus. The pendulous member is released when the objective lens is returned to the initial position, and then may assume another position.

Further and other objects will be apparent from the description of the accompanying drawings in which like numerals refer to like parts.

In the drawings:

FIG. 1 is a perspective view of a camera shown schematically, with parts broken away and parts omitted, and illustrating one embodiment of the invention;

FIG. 2 is a schematic illustration of the rangefinding procedure according to this invention;

FIG. 3 is a side-elevational view of said embodiment illustrating a pendulous member in free swinging condition in said camera;

FIG. 4 is a view of said embodiment taken along section line 4—4 of FIG. 3, and illustrating the pendulous member in an unlocked condition, with parts broken away in part;

FIG. 5 is a view similar to FIG. 4, illustrating parts in a locked condition; and FIG. 6 is a view according to broken section line 6—6 of FIG. 3.

Referring now to FIG. 1, a camera 10 is shown comprising a housing 11 enclosing a focusing mechanism generally designated 12. Housing 11, when oriented as in the drawings, is defined by a top wall 13, a base 14, a rear wall 15, opposite sidewalls 16 (FIG. 6) and 17, and a front wall 18. From the latter, there projects forwardly an annulus 19, having an internal spiral thread 21, concentric with an optical axis 20 (FIG. 2) of the camera. An objective lens assembly 22 comprising a lens mount 23 and a lens 24 is rotationally arranged for movement longitudinally of optical axis 20 adjacent annulus 19. An annular shoulder 25 fashioned in lens mount 23 is adapted to limit rearward movement of said objective lens assembly by engagement with the forward end of annulus 19. An annular ring 26, which comprises an integral rear portion of lens mount 23 and having an external diameter about equal to the internal diameter of annulus 19, is threaded as at 27 for operative meshing engagement with thread 21 whereby upon application of manual torque to objective assembly 22 in an appropriate angular direction, lens 24 may be moved longitudinally of the optical axis, for example, from an out of focus position to an "in focus" position.

For each focal distance, lens 24 has an "in focus" position longitudinally of its optical axis. For camera 10, the "in focus" lens positions have been predetermined for various distances in accordance with the conventional practice. A scale 29 of indicia representing select distances is carried circumferentially of lens mount 23. The scale is arranged so that upon registration of each distance indicator and a relatively fixed indexing line 30 carried on annulus 19, lens 24 will be "in focus" conditioned for the indicated distance. Accordingly, camera 10 may be focused by estimating the focal distance and then rotating the objective lens assembly through its handle 28.

Focusing mechanism 12 obviates the requirement for estimating the focal distance. It comprises a pendulous member 31 adapted to swing freely, independently of camera 10 and objective lens assembly 22, about a pin 32 which is supported from a hanger plate 44 and defines an axis extending transversely of optical axis 20 but at a level within housing 11 which will not interfere with image transmission in the camera. Pendulous member 31 thereby can serve as a rangefinder. This concept is understood by now referring to FIG. 2, in which it is seen that camera 10 has a sighting means comprising lens 24 and a pair of mirrors 33 arranged to permit viewing the reflected image of a subject 75 through a viewing screen 34 mounted in rear wall 15. Upon angular displacement of camera 10 from its normal picture-taking aspect (dotted line) to its range-finding aspect (solid line) to sight the foot of a subject 75 extending upwardly from base 76 and with the pendulous member 31 in free swinging condition, the camera, that is to say its housing 11, and pendulous member 31 will rotate relative to each other. Free-swinging pendulous member 31 has an angular disposition relative said housing which corresponds to each angular disposition of said housing. This is significant because the focal distance varies according to the angle from the picture-taking position to the base of the subject. Accordingly, free-swinging pendulous member 31 can be made to assume an aspect relative to the housing which is a function of the focal distance.

It is recognized that for any given focal distance, the angle at the juncture of the hypotenuse line and the base line of a right triangle will vary according to the length of the vertical line. Since the height of the scene focusing position above a base 76 defines the length of the vertical line, an error factor may be introduced if the scene focusing position is above or below an intended position. However, this fact can be ignored as long as the scene focusing position is at about the same level relative to the subject's base for each picture. In this preferred embodiment, the cam surface 35 of the pendulous member 31 has been designed for eye level of a user considered to be of average height. In using this triangulation mechanism for focusing at relatively long distances from the camera, the error factor introduced by a user being taller or shorter than the "average" is compensated for by the ever increasing depth of the focus of the camera objective lens as the focal distance of that objective lens increases. When the taller or shorter user focuses the camera objective lens on a nearby subject where depth of focus is relatively shallow, however, the amount of error is proportionately increased. Thus, as for a cam such as disclosed herein computed for eye-level use of a user 5 feet 8 inches in height, experiments have shown that taller and shorter users obtained well focused pictures with a mechanism incorporating the same cam. Of course, if the camera is of the waist level view-finding type, the cam would be designed for the average height at which the camera would then be held rather than for eye-level.

Pendulous member 31 is semi-disc-shaped with an exterior curved am surface 35 fashioned so that when lens 24 is at any position which is a fixed or predetermined distance from said cam surface 35, said lens will be "in focus" with respect to a subject 75, the focal distance of which corresponds to the relative angular disposition of pendulous member 31. The above structure is described in substantially the same language in our copending application, previously referenced.

Accordingly, to photograph a subject properly, once its base has been sighted, the pendulous member should be locked in its angular rangefinding condition relative to housing 11 before the camera is returned to its picture-taking aspect. To releasably lock the pendulous member, a brake 36 is pivotally connected to the base 39 of a bracket or mounting boss 37 which is hung by its vertical side wall 38 from hanger plate 44. Brake 36 has a bearing head 40 which is biased toward engagement with a flat side of pendulous member 31 by a compression spring 43 to restrain relative angular rotation of the latter and camera housing 11. A finger 42 carried on an arm 41 of said brake supports spring 43 in bearing association with side wall 38.

A link or trip arm 45 which is pivoted to bracket base 39 as at 46 is adapted to condition brake 36 to release pendulous member 31. To that end said trip arm has work end portion 47 engaged with a lug 48 which is integral with brake 36 distal to bearing brake head 40. Distal work end portion 47, trip arm 45 has a vertical lug 49 which is spaced slightly radially from a rearward annular extension 50 (FIG. 3) of lens mount 23. A radially extending stud 51 (FIGS. 4 and 6) which is secured to annular extension 50 is longer than the distance between extension 50 and lug 49, and is arranged to move in an arcuate path into and out of trip arm motivating engagement with lug 49 as objective lens assembly 22 is rotated. Thereby, trip arm 45, which is normally urged by spring 43 to an inoperative position with respect to brake 36 (FIG. 5), can be moved by stud 51 to another position against the action of spring 43 to condition pendulous member 31 for free-swinging (FIGS. 4 and 6). Stud 51 preferably is arranged so that it frees pendulous member 31 when objective lens assembly 22 is disposed beyond all "in focus" conditions.

To operate The mechanism, pendulous member 31 is conditioned for freely swinging (FIGS. 3, 4 and 6). Camera housing 11 is then rotated at its picture-taking position so that the base of subject 75 can be seen through viewing port 34. In such position, pendulous member 31 has assumed an angular aspect corresponding to the focal distance. Brake 36 is then permitted to assume its locking position by slight angular displacement of objective lens assembly 22 to free trip arm 45 from engagement with stud 51. Thereby, pendulous member 31 becomes locked in its rangefinding attitude. Thereafter, the camera can be rotated to any picture-taking aspect without disturbing the angular relationship between said objective lens assembly and pendulous member. Objective lens assembly 22 is then rotated to move the lens 24 to stop it in its "in focus" position (FIG. 5) which is a fixed distance from cam surface 35.

To the latter end, there is provided stop means comprising a spacer rod 53 which is disposed parallel to the optical axis and transversely of the rotational axis of pendulous member 31. Spacer rod 53 has a supported portion 54 (FIG. 3) which is slidable axially in a pair of ears 55 fashioned on bracket 37. A biasing spring 56, bearing against one of the ears 55 and a collar 57 fixed on the supported rod portion 54, urges an axially adjustable end portion 58 of the spacer rod 53 into bearing engagement with the thereto relatively rotatable rear surface 59 of annular extension 50. When lens 24 is "out of focus", said spacer rod is spaced from pendulous member 31, thereby permitting adjustment of the objective lens assembly. The parts are fashioned and proportioned, however, so that when spacer rod 53 is driven into engagement with the pendulous member 31, the objective lens is set in its "in focus" position. For obtaining focusing in a most efficient manner, rear bearing surface 59 also may be cam-fashioned, as illustrated in FIGS. 3 and 5.

To provide for adjusting the length of spacer rod 53, to a desired length necessary to overcome manufacturing tolerances of the cooperating parts and to set the objective lens "in focus" position across the range of focus, bearing end portion 58 includes a threaded shank 61 which is operably engaged in an internally threaded well 62 formed to the forward end of supported rod portion 54 from which bearing end portion 58 is rigidly secured in adjusted association by means of a lock nut 64.

To prevent over-extension of objective lens assembly 22 when it is desired to condition pendulous member 31 for free-swinging, a stop member 65 (FIG. 6), which is carried by objective lens assembly 22, is disposed for engagement with a suitable abutment 66 when stud 51 is operably engaged with lug 49.

It is to be understood that the embodiments shown are illustrative of the principal operation of a camera focusing mechanism and that certain changes, alterations, modifications or substitutions can be made in the structure of the device without departing from the spirit and scope of the claims.

I claim:

1. In a camera having an objective assembly including a lens for focusing on a subject, a member mounted for pendulous movement relative said camera to any of a plurality of positions corresponding to the angular disposition of the optical axis of said lens with respect to a subject to be photographed for adjusting the focus of said lens relative to the subject, sighting means for viewing the subject for setting said optical axis at an angle corresponding to focal distance, and means for limiting movement of said objective lens assembly relative said pendulous member at lens-focusing condition, the combination in brake means for releasably securing said member and comprising a brake mounted for restraining movement of said member and brake trip means associated with said objective lens assembly for disengaging said brake from said pendulous member upon adjustment of said objective lens assembly to a predetermined condition and to permit again engaging said brake and said pendulous member upon adjustment of said objective lens assembly from said predetermined condition.

2. A combination according to claim 1 in which said brake trip means comprises a link engaging said brake and mounted for movement between a first position in which said brake is disengaged from said member and a second condition in which said member is restrained by said brake and having a boss carried by said objective lens assembly for moving said link between said first and second positions.

3. A combination according to claim 2 in which said objective lens assembly is rotationally mounted for adjusting said lens longitudinally of said optical axis and having means for biasing said brake into member-restraining condition, said boss disposed for permitting movement of said link by said biasing means to said first condition as said objective lens assembly is rotated toward and "in focus" position.

4. A combination according to claim 1 in which said member has an external curved cam surface disposed for engagement by said limiting means and a brake surface disposed normally to said cam surface for engagement by said brake.